US006930251B2

(12) United States Patent
Shotey et al.

(10) Patent No.: US 6,930,251 B2
(45) Date of Patent: Aug. 16, 2005

(54) BASE FOR ELECTRICAL OUTLET AND RELATED METHOD

(75) Inventors: Michael Shotey, Scottsdale, AZ (US); Edgar W. Maltby, Mesa, AZ (US)

(73) Assignee: TayMac Corporation, Gilbert, AZ (US)

(*) Notice: Subject to any disclaimer, the term of this patent is extended or adjusted under 35 U.S.C. 154(b) by 36 days.

(21) Appl. No.: 10/903,795

(22) Filed: Jul. 30, 2004

(65) Prior Publication Data

US 2005/0039939 A1 Feb. 24, 2005

Related U.S. Application Data

(63) Continuation of application No. 10/396,187, filed on Mar. 24, 2003, now Pat. No. 6,770,814, which is a continuation of application No. 09/965,936, filed on Sep. 27, 2001, now Pat. No. 6,559,381, which is a continuation of application No. 09/456,089, filed on Dec. 6, 1999, now Pat. No. 6,420,653.

(51) Int. Cl.[7] .................................................. H02G 3/14
(52) U.S. Cl. .............................. 174/66; 174/67; 174/53; 220/241
(58) Field of Search .............................. 174/66, 67, 48, 174/53, 50, 49, 57; 220/3.2, 3.3, 3.5, 3.6, 3.7, 3.8, 3.94, 241, 242; 200/333; D8/350, 353

(56) References Cited

U.S. PATENT DOCUMENTS 946,646 A 1/1910 Pratt
3,432,611 A 3/1969 Gaines et al.
3,437,738 A 4/1969 Wagner (Continued)

OTHER PUBLICATIONS

34 UL 514 C–38, Dec. 26, 1996., pp. 34–35.

Pass & Seymour, "TradeMaster Weatherproof While–in–Use–Covers", Apr., 1999, Catalog No. WIUC20C.

*Primary Examiner*—Anthony Dinkins
*Assistant Examiner*—Angel R. Estrada
(74) *Attorney, Agent, or Firm*—Schmeiser Olsen & Watts, LLP (57) ABSTRACT

A base for an electrical outlet. The electrical outlet includes a mounting screw aperture disposed along a longitudinal axis for receiving a mounting screw having a mounting screw head to mount the electrical outlet to a box. The mounting screw head has a mounting screw head diameter. The electrical outlet also has at least one socket face for receiving an electrical plug. The base includes a substantially planar backing member, the backing member including at least one aperture for receiving the at least one socket face. The base also includes a keyhole slot disposed in the backing member and having first and second keyhole slot apertures. The first keyhole slot aperture is larger than the mounting screw head diameter. The second keyhole slot aperture is smaller than the mounting screw head diameter and is disposed in the backing member at a location on the longitudinal axis and aligned with the mounting screw aperture when the base is mounted to the electrical outlet using the mounting screw. Related methods also are disclosed.

15 Claims, 6 Drawing Sheets

U.S. PATENT DOCUMENTS

| | | | |
|---|---|---|---|
| 3,438,534 A | 4/1969 | Zerwes | |
| 3,518,356 A | 6/1970 | Friedman | |
| 3,525,450 A | 8/1970 | Payson | |
| 3,530,230 A | 9/1970 | Cormier et al. | |
| 3,544,703 A | 12/1970 | Jones | |
| 3,895,179 A | 7/1975 | Wyatt | |
| 3,965,287 A | 6/1976 | Mueller | |
| 4,032,030 A | 6/1977 | Bass et al. | |
| 4,500,746 A | 2/1985 | Meehan | |
| 4,737,599 A | 4/1988 | Fontaine | |
| 4,757,908 A | 7/1988 | Medlin, Sr. | |
| 4,833,277 A | 5/1989 | Jacoby, Jr. et al. | |
| 4,844,275 A | 7/1989 | Schnell et al. | |
| 4,998,635 A | 3/1991 | Vink et al. | |
| 5,072,848 A | 12/1991 | Pipis et al. | |
| 5,178,350 A | 1/1993 | Vink et al. | |
| 5,362,924 A | 11/1994 | Correnti | |
| 5,456,373 A | 10/1995 | Ford | |
| 5,486,650 A | 1/1996 | Yetter | |
| 5,763,831 A | 6/1998 | Shotey et al. | |
| 6,066,805 A | 5/2000 | Bordwell et al. | |
| 6,420,653 B1 * | 7/2002 | Shotey et al. | 174/66 |
| 6,559,381 B2 * | 5/2003 | Shotey et al. | 174/67 |
| 6,770,814 B2 * | 8/2004 | Shotey et al. | 174/66 |

* cited by examiner

BASE FOR ELECTRICAL OUTLET AND RELATED METHOD

BACKGROUND OF THE INVENTION

This application is a continuation of U.S. patent application Ser. No. 10/396,187, filed on Mar. 24, 2003, now U.S. Pat. No. 6,770,814, entitled "BASE FOR ELECTRICAL OUTLET AND RELATED METHOD", which is a continuation of patent application by Shotey, et al. entitled "BASE FOR ELECTRICAL OUTLET AND RELATED METHOD", Ser. No. 09/965,936, filed Sep. 27, 2001, now U.S. Pat. No. 6,559,381, which is also a continuation of patent application by Shotey, et al. entitled "BASE FOR ELECTRICAL OUTLET AND RELATED METHOD", Ser. No. 09/456,089, filed Dec. 6, 1999, now U.S. Pat. No. 6,420,653, the disclosures of which are hereby incorporated herein by reference.

FIELD OF THE INVENTION

The present invention relates to electrical outlets and receptacles, and more specifically, to covers for such outlets and receptacles, and related components and methods.

DESCRIPTION OF THE RELATED ART

Electrical outlets traditionally have included an assembly of components that include the electrical receptacle, a box into which the receptacle is mounted, and a cover plate. The receptacle typically includes one or more sockets into which the blades of a plug, such as the plug from an electrical appliance, would be inserted. The receptacle typically is mounted to the box by a pair of box mounting screws, with one located at the top of the box and one located at the bottom. Traditional cover plates typically cover the outlet, except for the socket face or faces, at which the socket faces of the receptacle contact the plug. Such traditional cover plates commonly are mounted to the receptacle using a cover plate mounting screw located substantially in the center of the receptacle and cover plate.

In some instances, it is desirable to have a base positioned around the receptacle, or specifically around the socket face or faces, for example, to which a cover or cover plate may be attached. In recent years, for example, it has become desirable, particularly for exterior or outdoor applications, to have a receptacle cover that covers the entire receptacle, including the socket faces, so that water and other liquids cannot contact the interface at which the plug contacts the socket face or faces when the outlet is not in use. Some such covers have cord conduits through the cover so they provide weatherproofing even when the outlet is in use. An example is provided in U.S. Pat. No. 5,763,831, assigned to TayMac Corporation, of Phoenix, Ariz. Such covers have come to be known generally as "weatherproof" covers, not necessarily in that they entirely prevent weather or moisture from reaching the outlet, but in that they provide some level of protection from weather, liquids and/or moisture. Examples of such cover designs are provided in U.S. Pat. No. 5,763,831. Such weatherproof covers typically include a base, usually attached to the box, to which the cover component is attached.

When installing or replacing such covers, and more particularly when installing or replacing the base component, a significant amount of time can be required. The base typically is attached to the box with a pair of box mounting screws, as described above for traditional outlets. These box mounting screws must be unscrewed and completely removed if an existing base is to be removed. The new base then is positioned, and box mounting screws are screwed in to secure the base to the box. It is also usually necessary during this process to pause at the appropriate time while installing the box screws to properly align the base. In a typical circumstance, one often replaces a number of such bases and outlet covers, rather than only a single base and cover. When erecting new buildings, for example, it often is necessary to install large numbers of such bases and cover plates. The amount of time involved in installing, or replacing, such bases and covers therefore can add up rather quickly.

OBJECTS OF THE INVENTION

Accordingly, an object of the present invention is to provide a base for an electrical outlet, and related method, wherein the base can be installed or replaced relatively quickly and/or inexpensively.

Another object of the present invention is to provide a base for an electrical outlet, and related method, wherein the base can be aligned relatively quickly and/or inexpensively.

Additional objects and advantages of the invention will be set forth in the description, which follows, and in part will be apparent from the description, or may be learned by practice of the invention. The objects and advantages of the invention may be realized and obtained by means of the instrumentalities and combinations pointed out in the appended claims.

SUMMARY OF THE INVENTION

To achieve the foregoing objects, and in accordance with the purposes of the invention as embodied and broadly described in this document, a base is provided for an electrical outlet. The electrical outlet includes a mounting screw aperture disposed along a longitudinal axis for receiving a mounting screw having a mounting screw head to mount the electrical outlet to a box. The mounting screw head has a mounting screw head diameter. The electrical outlet also has at least one socket face for receiving an electrical plug.

The base according to one aspect of the invention comprises a substantially planar backing member. The backing member includes at least one aperture for receiving the at least one socket face, and a keyhole slot disposed in the backing member. The keyhole slot has first and second keyhole slot apertures. The first keyhole slot aperture is larger than the mounting screw head diameter. The second keyhole slot aperture is smaller than the mounting screw head diameter and is disposed in the backing member at a location on the longitudinal axis and aligned with the mounting screw aperture when the base is mounted to the electrical outlet using the mounting screw.

Optionally, the second keyhole slot aperture may include a bevel. In a presently preferred embodiment, the first and second keyhole slot apertures are disposed along a keyhole line substantially perpendicular to the longitudinal axis. In another presently preferred embodiment, the first and second keyhole slot apertures are disposed along a keyhole line substantially collinear with the longitudinal axis.

In another presently preferred embodiment according to this aspect of the invention, the base further includes a base mounting aperture disposed in the backing member and having a diameter larger than the mounting screw head diameter. The base mounting aperture is disposed in the backing member at a location on the longitudinal axis. The base according to this aspect of the invention further includes a retaining device removably disposed on the base mounting aperture. The retaining device has an inside diameter smaller than the mounting screw head diameter.

In accordance with another embodiment, the base further includes a channel extending from the at least one socket face receiving aperture. The channel is narrower than the mounting screw head diameter. Preferably but optionally, the first and second keyhole apertures and the channel lie along a keyhole line.

In accordance with another aspect of the invention, a base is provided for an electrical outlet. The electrical outlet includes first and second mounting screw apertures disposed along a longitudinal axis for receiving respective first and second mounting screws each having a mounting screw head to mount the electrical outlet to a box. The mounting screw heads have a mounting screw head diameter. The electrical outlet also has at least one socket face for receiving an electrical plug.

The base according to this aspect of the invention comprises a substantially planar backing member. The backing member includes at least one aperture for receiving the at least one socket face. The base further includes first and second keyhole slots disposed in the backing member. Each of the first and second keyhole slots has first and second keyhole slot apertures. The first keyhole slot aperture is larger than the mounting screw head diameter. The second keyhole slot aperture is smaller than the mounting screw head diameter and is disposed in the backing member at a location on the longitudinal axis. The second keyhole slot aperture of the first keyhole slot is aligned with the first mounting screw aperture and the second keyhole slot aperture of the second keyhole slot is aligned with the second mounting screw aperture when the base is mounted to the electrical outlet using the first and second mounting screws.

Preferably but optionally, at least one of the second keyhole slot aperture of the first keyhole slot and the second keyhole slot aperture of the second keyhole slot includes a bevel. In a preferred embodiment, the first and second keyhole slot apertures of the first and second keyhole slots are disposed along respective first and second keyhole lines substantially perpendicular to the longitudinal axis. In another embodiment, the first and second keyhole slot apertures of the first and second keyhole slots are disposed along a keyhole line substantially collinear with the longitudinal axis.

In accordance with another aspect of the invention, a base is provided for an electrical outlet. The electrical outlet includes a mounting screw aperture disposed along a longitudinal axis for receiving a mounting screw having a mounting screw head to mount the electrical outlet to a box. The mounting screw head has a mounting screw head diameter. The electrical outlet also has at least one socket face for receiving an electrical plug.

The base according to this aspect of the invention comprises a substantially planar backing member. The backing member includes at least one aperture for receiving the at least one socket face. The base also includes a base mounting aperture disposed in the backing member at a location aligned with the mounting screw aperture when the base is mounted to the electrical outlet using the mounting screw. The base mounting aperture is larger than the mounting screw head diameter. The base also includes a retaining device removably disposed on the base mounting aperture. The retaining device has a diameter smaller than the mounting screw head diameter. Preferably but optionally, the retaining device includes a beveled surface. The base mounting aperture may include a beveled surface and the retaining device may include a beveled surface for mating with the base mounting aperture beveled surface.

In accordance with still another aspect of the invention, a method is provided for mounting a base to an electrical outlet. The electrical outlet includes a mounting screw aperture disposed along a longitudinal axis for receiving a mounting screw having a mounting screw head to mount the electrical outlet to a box. The mounting screw head has a mounting screw head diameter. The electrical outlet also has at least one socket face for receiving an electrical plug.

In accordance with another aspect of the invention, a method is provided for mounting a base to an electrical outlet. The electrical outlet includes a mounting screw aperture disposed along a longitudinal axis for receiving a mounting screw having a mounting screw head to mount the electrical outlet to a box. The mounting screw head has a mounting screw head diameter. The electrical outlet also has at least one socket face for receiving an electrical plug.

The method according to this aspect of the invention includes a first step of providing the base with a substantially planar backing member. The backing member includes at least one aperture for receiving the at least one socket face, and a keyhole slot disposed in the backing member and having first and second keyhole slot apertures. The first keyhole slot aperture is larger than the mounting screw head diameter. The second keyhole slot aperture is smaller than the mounting screw head diameter and is disposed in the backing member at a location on the longitudinal axis and aligned with the mounting screw aperture when the base is mounted to the electrical outlet using the mounting screw.

The method includes a second step of partially inserting the mounting screw into the mounting screw aperture through the second keyhole slot aperture, a third step of testing the alignment of the base with the outlet so that the first keyhole slot aperture is aligned with the mounting screw aperture, and a fourth step of tightening the mounting screw to secure the mounting screw head onto the base at the second keyhole slot aperture.

Optionally but preferably, the first step includes providing the second keyhole slot aperture with a bevel, and the fourth step includes tightening the mounting screw so that the mounting screw head resides in the bevel. Also as an option, the first step may include disposing the first and second keyhole slot apertures along a keyhole line substantially perpendicular to the longitudinal axis. The first step also may include disposing the first and second keyhole slot apertures along a keyhole line substantially collinear with the longitudinal axis.

In a version of this method, the first step includes disposing a second mounting aperture in the backing member. The second mounting aperture has a diameter larger than the mounting screw head diameter, and the second mounting aperture is disposed in the backing member at a location on the longitudinal axis. In this version of the method, the fourth step includes using a retaining device on the second mounting aperture. The second retaining device has a diameter smaller than the mounting screw head diameter.

In another version of the method, the first step includes providing a channel in the base. The channel extends from the at least one socket face receiving aperture. The channel is narrower than the mounting screw head diameter. Optionally but preferably, the first step includes disposing the first and second keyhole slot apertures and the channel along a keyhole line.

In accordance with another aspect of the invention, a method is provided for mounting a base to an electrical outlet. The electrical outlet includes first and second mounting screw apertures disposed along a longitudinal axis for receiving respective first and second mounting screws each having a mounting screw head to mount the electrical outlet to a box. The mounting screw heads having a mounting screw head diameter. The electrical outlet also has at least one socket face for receiving an electrical plug.

The method according to this aspect of the invention comprises a first step of providing a substantially planar backing member. The backing member includes at least one aperture for receiving the at least one socket face. It also includes first and second keyhole slots disposed in the backing member. Each of the first and second keyhole slots has first and second keyhole slot apertures. The first keyhole slot aperture is larger than the mounting screw head diameter. The second keyhole slot aperture is smaller than the mounting screw head aperture, and is disposed in the backing member at a location on the longitudinal axis. The second keyhole slot aperture of the first keyhole slot is aligned with the first mounting screw aperture, and the second keyhole slot aperture of the second keyhole slot is aligned with the second mounting screw aperture when the base is mounted to the electrical outlet using the first and second mounting screw.

The method includes a second step of partially inserting the first and second mounting screws into the respective first and second mounting screw apertures through the respective first and second keyhole apertures. It also includes a third step of testing the alignment of the base with the outlet so that the first keyhole slot apertures of the first and second keyhole slots are aligned with the respective first and second mounting screw apertures. It further includes a fourth step of tightening the first and second mounting screws to secure the mounting screws heads of the first and second mounting screws onto the base at the second keyhole slot apertures of the respective first and second keyhole slots.

In preferred versions of the methods, the first step includes providing at least one of the second keyhole slot aperture of the first keyhole slot and the second keyhole slot aperture of the second keyhole slot with a bevel. The first step may include disposing the first and second keyhole slot apertures of the first and second keyhole slots along respective first and second keyhole lines substantially perpendicular to the longitudinal axis. Similarly, the first step may include disposing the first and second keyhole slot apertures of the first and second keyhole slots along a keyhole line substantially collinear with the longitudinal axis.

In accordance with still another aspect of the invention, a method is provided for mounting a base to an electrical outlet. The electrical outlet includes a mounting screw aperture disposed along a longitudinal axis for receiving a mounting screw having a mounting screw head to mount the electrical outlet to a box. The mounting screw head has a mounting screw head diameter. The electrical outlet also has at least one socket face for receiving an electrical plug. The method according to this aspect of the invention includes a first step of providing a substantially planar backing member. The backing member includes at least one aperture for receiving the at least one socket face. It also includes a base mounting aperture disposed in the backing member at a location aligned with the mounting screw aperture when the base is mounted to the electrical outlet using the mounting screw. The base mounting aperture is larger than the mounting screw head diameter.

The method also includes a second step of partially inserting the mounting screw into the electrical outlet and a third step of using a detachable retaining device on the base mounting aperture wherein the retaining device has a diameter smaller than the mounting screw head diameter, and tightening the mounting screw to secure the mounting screw head onto the retaining device.

Optionally, the third step may include providing a beveled surface on the retaining device, and tightening the mounting screw so that the mounting screw head seats in the bevel. Also as an option, the first step may include providing the base mounting aperture with a beveled surface and providing the retaining device with a beveled surface for mating with the base mounting aperture beveled surface, and the third step may include tightening the mounting screw so that the retaining device bevel mates with the base mounting aperture bevel.

BRIEF DESCRIPTION OF THE DRAWINGS

The accompanying drawings, which are incorporated in and constitute a part of the specification, illustrate a presently preferred embodiment(s) and method(s) of the invention and, together with the general description given above and the detailed description of the preferred embodiment(s) and method(s) given below, serve to explain the principles of the invention.

DETAILED DESCRIPTION OF THE PREFERRED EMBODIMENTS AND METHODS

Reference will now be made in detail to the presently preferred embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification, and appropriate equivalents.

In accordance with one aspect of the invention, a base is provided for an electrical outlet. The electrical outlet includes a mounting screw aperture disposed along a longitudinal axis for receiving a mounting screw having a mounting screw head to mount the electrical outlet to a box. The mounting screw head has a mounting screw head diameter. The electrical outlet also has at least one socket face for receiving an electrical plug.

Figure 1:
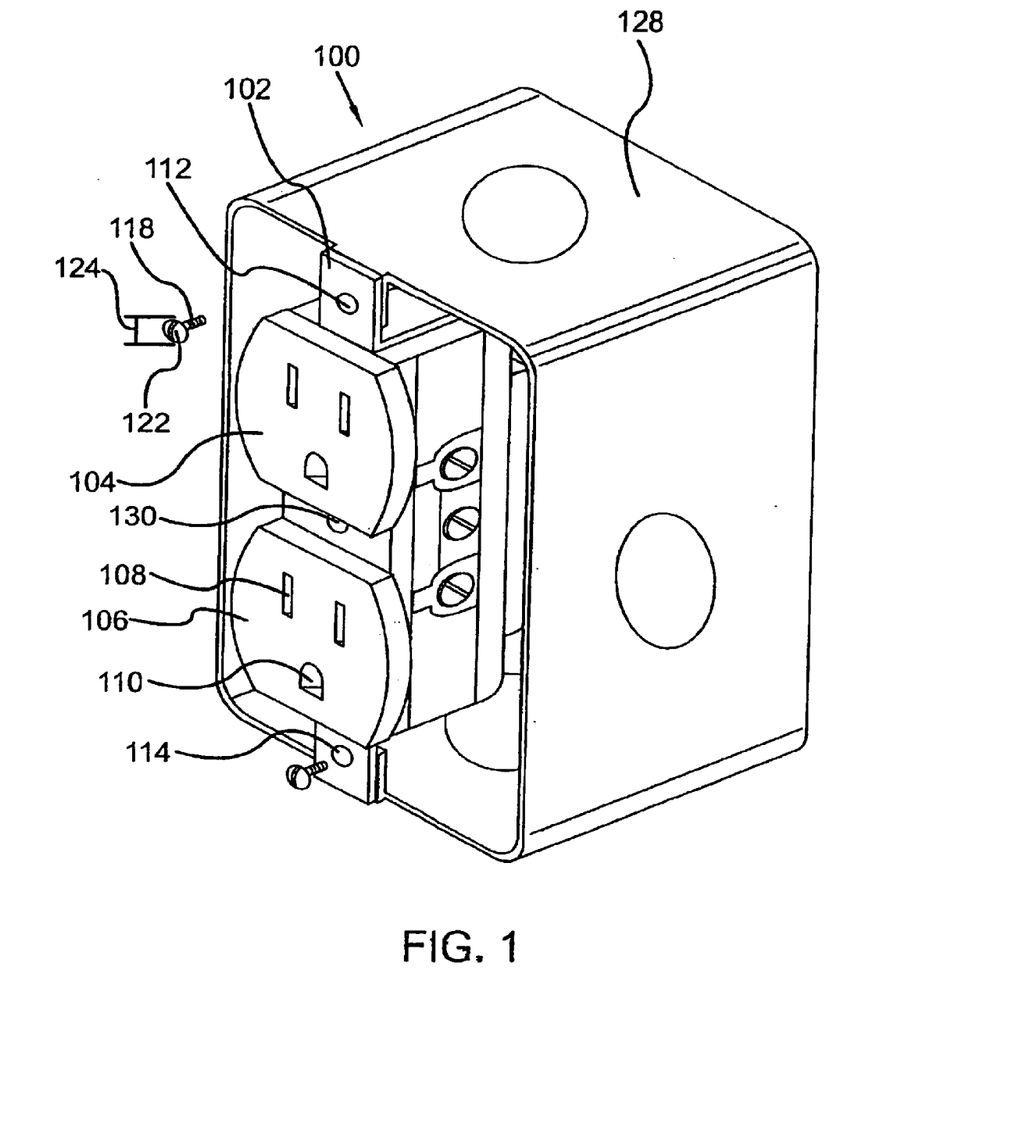
FIG. 1 shows a front elevational view of an outlet with which bases according to the preferred embodiments of the invention as described herein may be attached, and with which the preferred methods according to the invention may be practiced.

To provide an illustrative example, FIG. 1 shows an electrical outlet 100. Electrical outlet 100 includes a receptacle 102 that includes a pair of socket faces 104 and 106. Each socket face includes blade apertures 108 and a ground plug aperture 110 for receiving plug blades and a ground blade from a plug (not shown), such as the plug of a household electrical appliance. Receptacle 102 includes a pair of mounting screw apertures 112 and 114 disposed along a longitudinal axis L for receiving mounting screws 118 and 120, respectively. Each mounting screw includes a mounting screw head 122 having a mounting screw head diameter 124. Tightening of mounting screw 118 into mounting screw aperture 112, and tightening of mounting screw 120 into mounting screw aperture 114 secures receptacle 102 to a box 128. Receptacle 102 also includes a cover plate mounting aperture 128 for receiving a cover plate mounting screw (not shown).

The base according to this aspect of the invention includes a substantially planar backing member. The backing member includes at least one aperture for receiving the at least one socket face.

Figure 2:
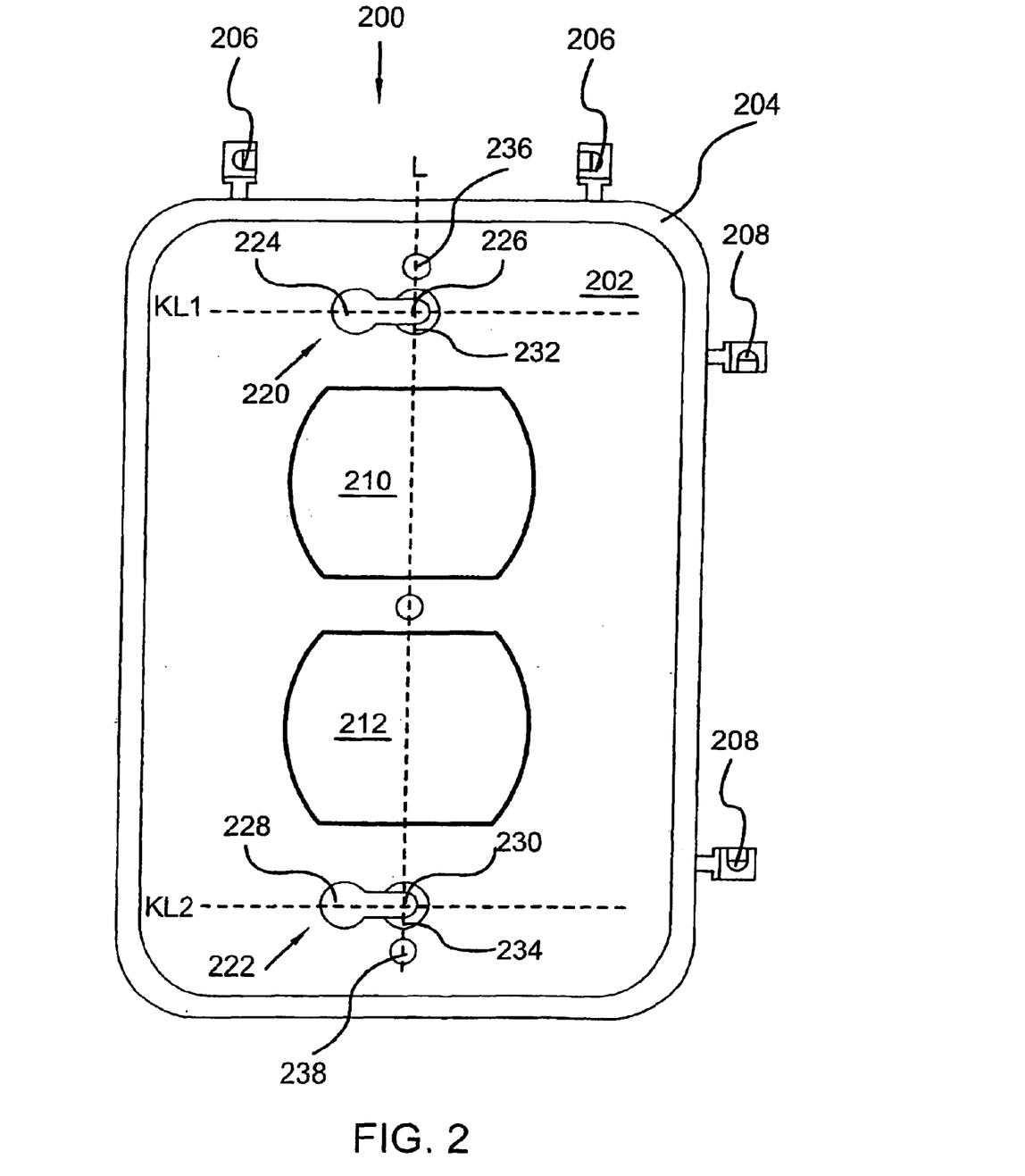
FIG. 2 shows a front view of a base according to a preferred embodiment of the invention.

A base 200 according to a presently preferred embodiment according to this aspect of the invention is shown in FIG. 2. Base 200 includes a substantially planar backing member 202. Base 200 also includes a ridge or wall 204 at its outer perimeter, which is substantially perpendicular to backing member 202. Two pairs of hinges 206 and 208 are disposed on the top and side peripheral side walls, respectively, of base 200. Hinges 206 and 208 are adapted to be selectively detached, as generally shown in U.S. Pat. No. 5,763,831.

Backing member 202 includes at least one aperture, in this specific instance, a pair of apertures 210 and 212, for receiving socket faces 104 and 106, respectively.

In accordance with this aspect of the invention, the base includes a keyhole slot disposed in the backing member and having first and second keyhole slot apertures. The first keyhole slot aperture is larger than the mounting screw head diameter. The second keyhole slot aperture is smaller than the mounting screw head diameter and is disposed in the backing member at a location on the longitudinal axis and is aligned with the mounting screw aperture when the base is mounted to the electrical outlet using the mounting screw.

In accordance with another aspect of the invention, the base includes first and second keyhole slots disposed in the backing member. Each of the first and second keyhole slots has first and second keyhole slot apertures. The first keyhole slot aperture is larger than the mounting screw head diameter. The second keyhole slot aperture is smaller than the mounting screw head diameter and is disposed in the backing member at a location on the longitudinal axis. The second keyhole slot aperture of the first keyhole slot is aligned with the first mounting screw aperture and the second keyhole slot aperture of the second keyhole slot is aligned with the second mounting screw aperture when the base is mounted to the electrical outlet using the first and second mounting screw.

As implemented in the preferred embodiment shown in FIG. 2, backing member 202 includes two keyhole slots 220 and 222. Keyhole slot 220 includes a first keyhole slot aperture 224 and a second keyhole slot aperture 226. Similarly, keyhole slot 222 includes a first keyhole slot aperture 228 and a second keyhole slot aperture 230. The first keyhole slot apertures 226 and 230 include a bevel 232 and 234, respectively. Each bevel extends downwardly and inwardly with respect to the aperture, as one moves into backing member 202. The first keyhole slot aperture 224 and 228 of each keyhole slot is larger than mounting screw head diameter 124. The second keyhole slot aperture 226 and 230 of each keyhole slot is smaller than mounting screw head diameter 124. The second keyhole slot aperture 226 and 230 of each keyhole slot is disposed in backing member 202 at a location on longitudinal axis L. The second keyhole slot aperture 226 of keyhole slot 220 is aligned with first mounting screw aperture 112. Second keyhole slot aperture 230 of keyhole slot 222 similarly is aligned with mounting screw aperture 114 when base 200 is mounted to an electrical outlet, such as outlet 100, using mounting screws 118 and 120, respectively.

From FIG. 2 it can be seen that the first and second keyhole slot apertures 224 and 226 of keyhole slot 220 are disposed along a keyhole line KL1 that is substantially perpendicular to longitudinal axis L, and first and second keyhole slot apertures 228 and 230 of keyhole slot 222 are disposed along a keyhole line KL2 that is also substantially perpendicular to longitudinal axis L.

Figure 3:
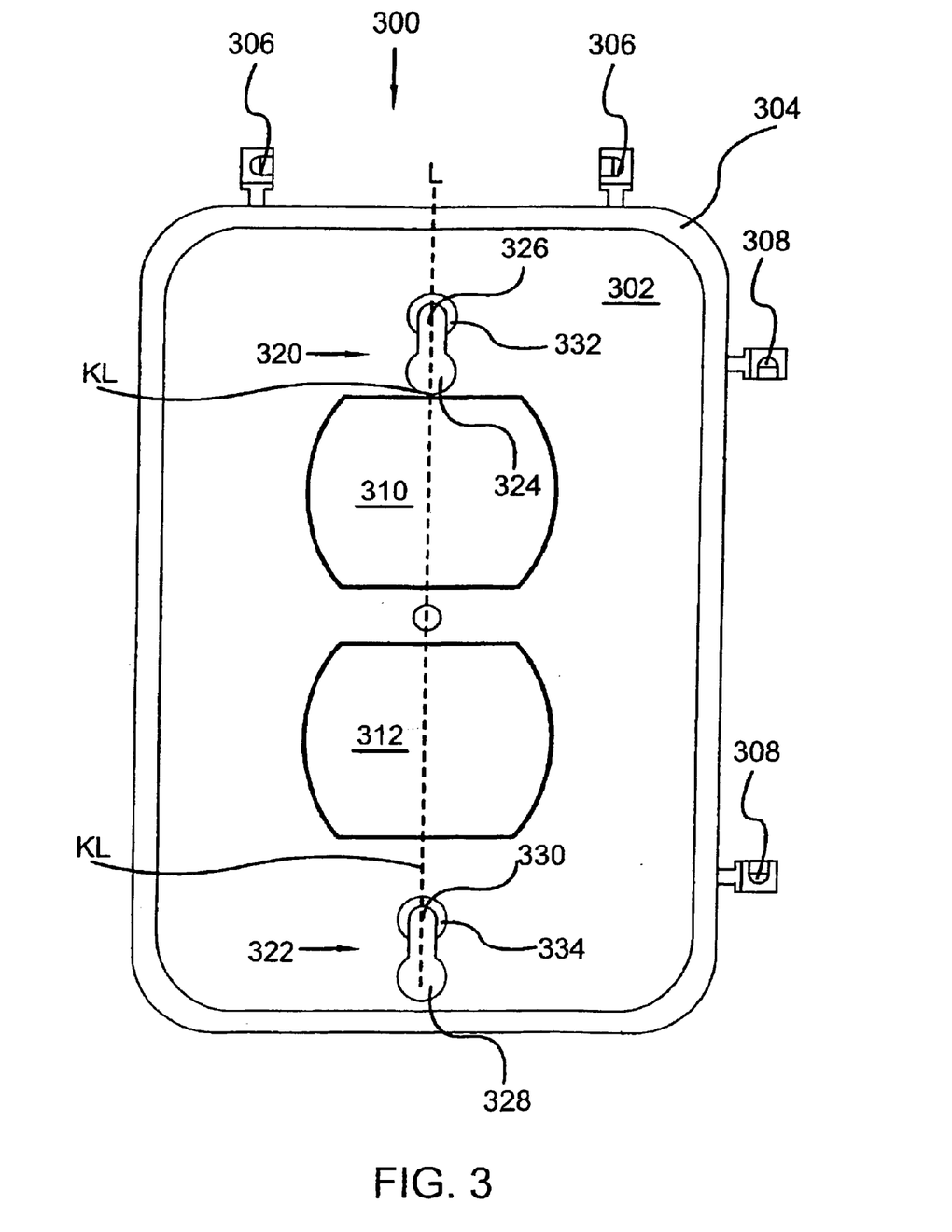
FIG. 3 shows a front view of a base according to another preferred embodiment of the invention.

In another presently preferred embodiment, the first and second keyhole apertures are disposed along a keyhole line substantially collinear with the longitudinal axis. To provide an illustrative example, a base 300 similar to base 200 (FIG. 2) is shown in FIG. 3. The components of base 300 are for the most part identical to those of base 200, and like reference characters are used to identify like or identical elements or components. In base 300, however, keyhole slots 320 and 322 are aligned along longitudinal axis L so that, for each of the keyhole slots, a line through the center of the first and second keyhole slot apertures lies along longitudinal axis L.

In another presently preferred embodiment according to this aspect of the invention, the base further includes a base mounting aperture disposed in the backing member and having a diameter larger than the mounting screw head diameter. The base mounting aperture is disposed in the backing member at a location on the longitudinal axis. The base according to this aspect of the invention further includes a retaining device removably disposed on the base mounting aperture. The retaining device has a diameter smaller than the mounting screw head diameter.

Figure 4:
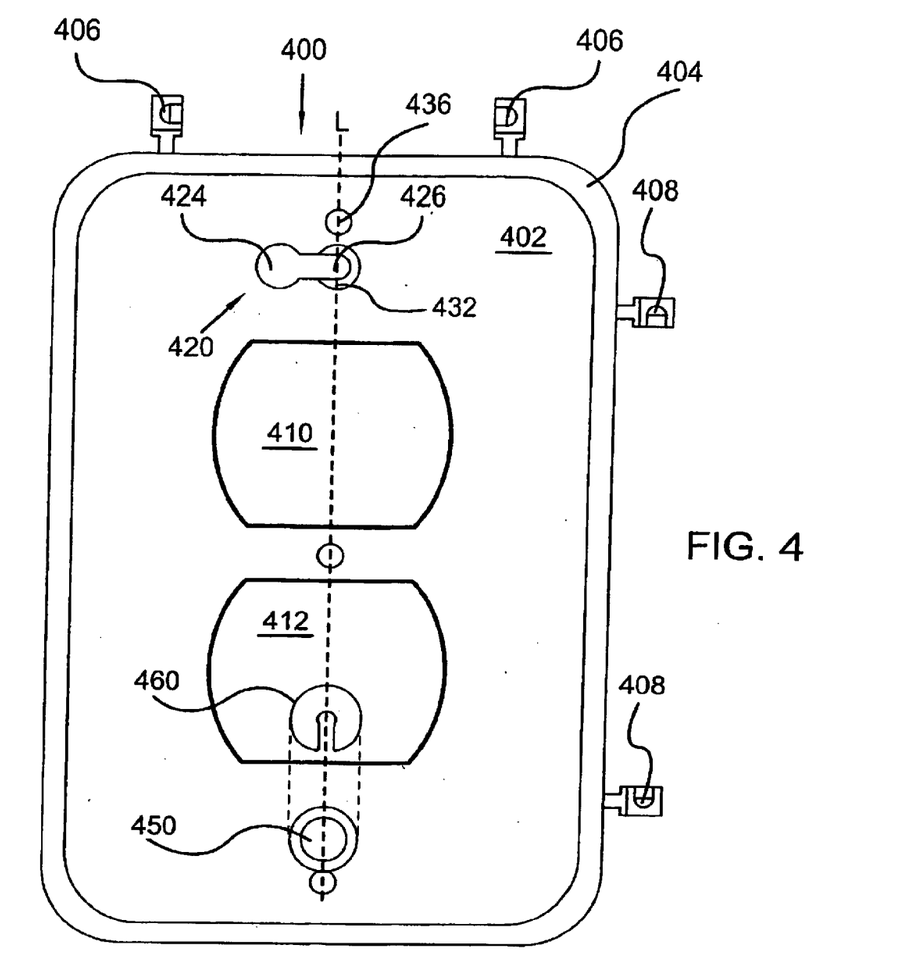
FIG. 4 shows a front view of a base according to another aspect of the invention.

To provide an illustrative example, a base 400 according to this preferred embodiment is shown in FIG. 4. Base 400 is identical in most respects to 200, and corresponding reference numerals are used to identify similar or identical components shared by the two versions. Base 400, however, includes a second mounting aperture 450 disposed in backing member 402. Mounting aperture 450 has a diameter that is larger than the diameter 124 of mounting screw 120. Mounting aperture 450 is disposed in backing member 402 at a location on longitudinal axis L that is aligned with mounting screw aperture 114 (FIG. 1) when base 400 is attached to electrical outlet 100.

Base 400 further includes a retaining device in the form of a slotted washer 460. Retaining device 460 is a separate component, and is removably disposed on mounting aperture 450.

In the preferred version of base 400, mounting aperture 450 includes a bevel 452. The retaining device 460 similarly includes a bevel 462. These bevels are configured so that, when retaining device 460 is positioned on mounting aperture 450, bevel 462 contacts and mates with bevel 452.

Figure 6:
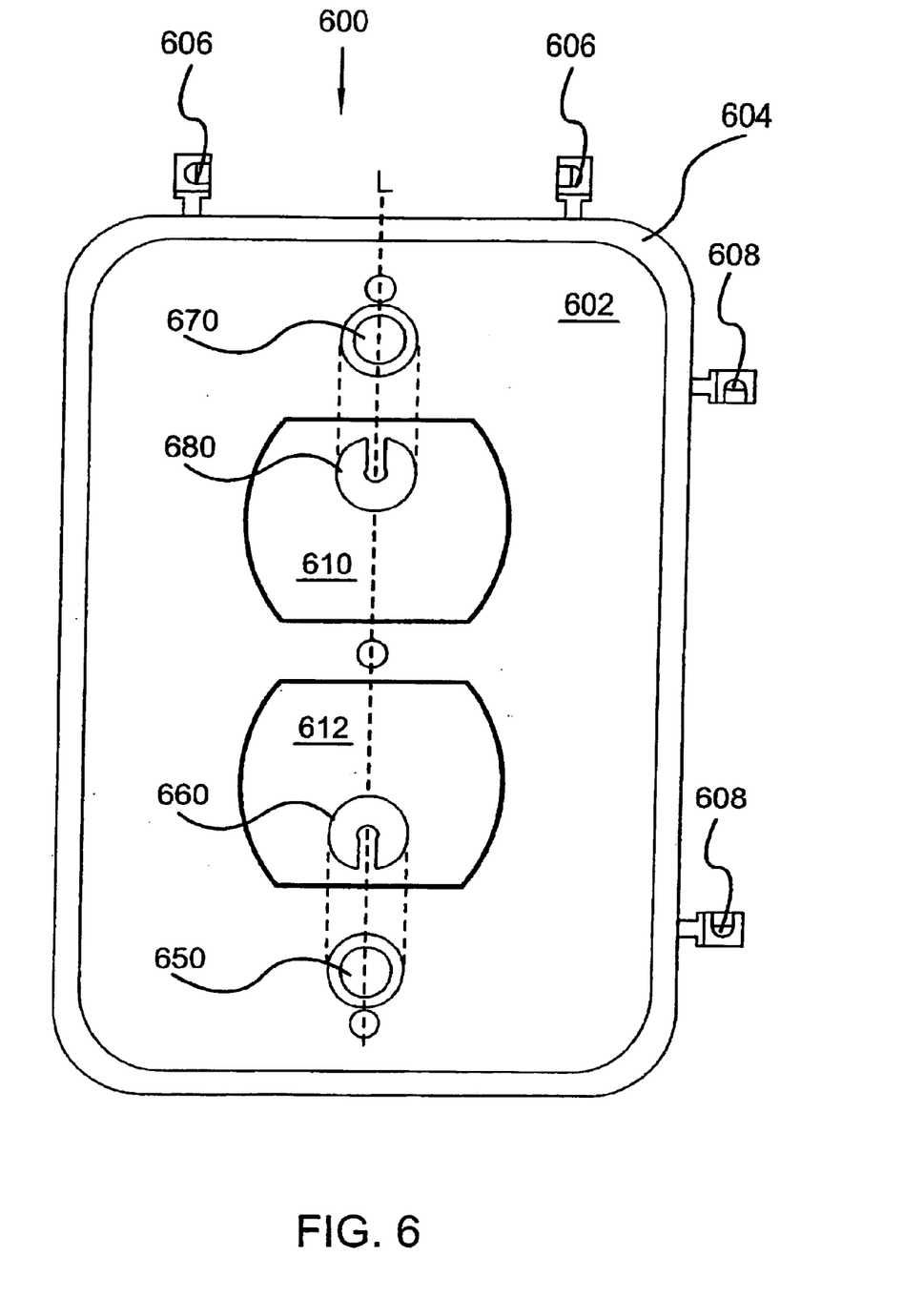
FIG. 6 shows a front view of another base according to another preferred embodiment of the invention.

With reference to FIG. 6, a base 600 is provided which includes two base mounting apertures. More specifically, base 600, which is in other respects identical to base 400 and therefore uses corresponding reference numerals, includes two base mounting apertures 650 and 670. Mounting aperture 650 is disposed in backing member 602 so that it is aligned with mounting screw aperture 114 when base 600 is attached to electrical outlet 100. Similarly base mounting aperture 670 is positioned in backing member 602 so that it is aligned with mounting screw aperture 112 when base 600 is attached to electrical outlet 100. Retaining devices 660 and 680 identical to retaining device 460. Base mounting apertures 650 and 670 preferably are identical to base mounting aperture 450. Accordingly, bevels corresponding to bevel 462 and bevel 452 are used to mate retaining devices 660 and 680 on base mounting apertures 650 and 670, respectively.

Figure 5:
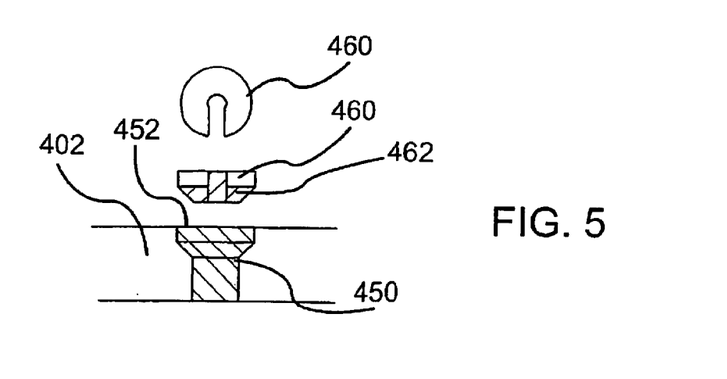
FIG. 5 shows a side view of the base shown in FIG. 4, including a side view of a retaining device used as a part of the base, and also shows a top or plan view of the retaining device.
Figure 7:
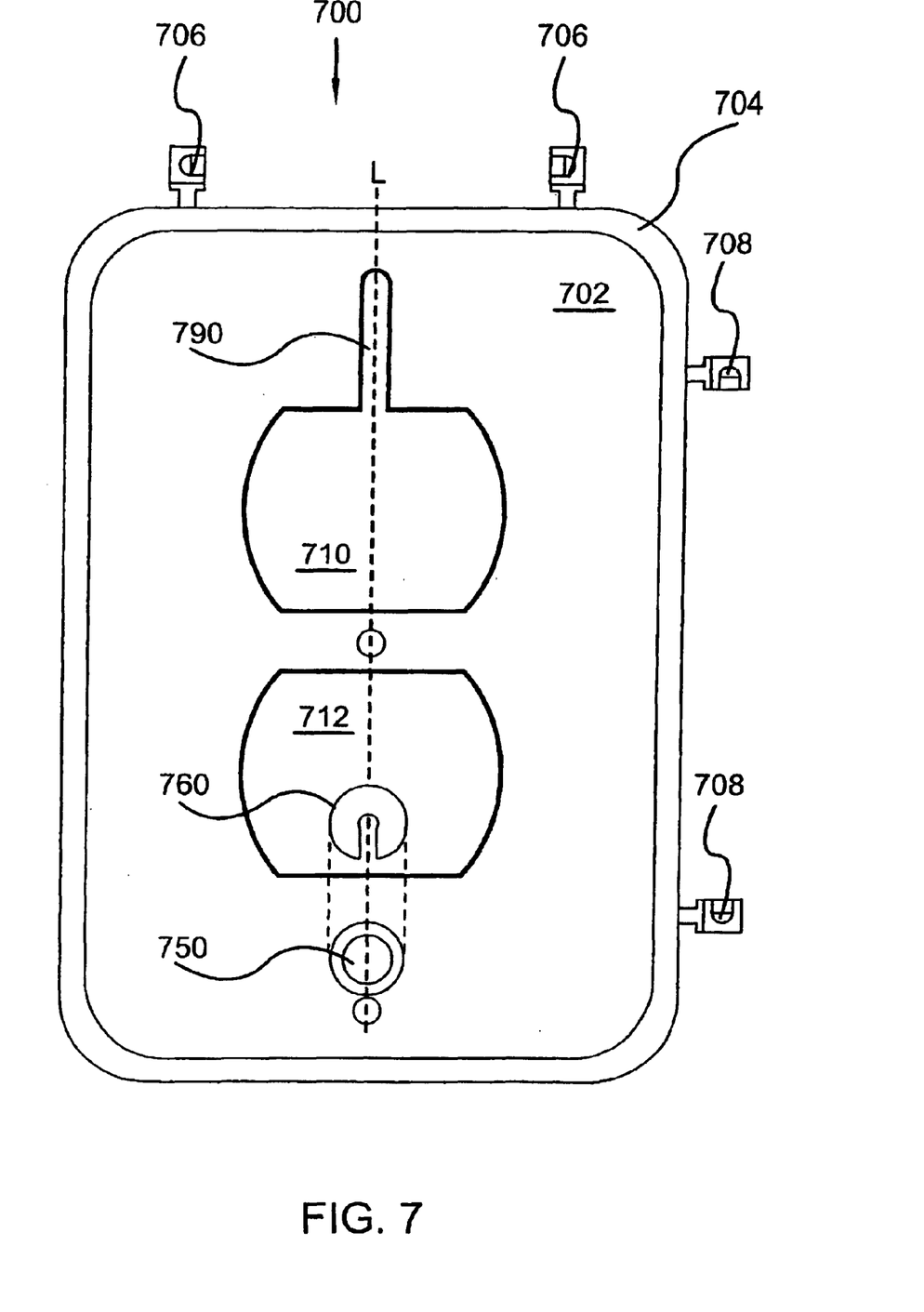
FIG. 7 shows still another base according to yet another preferred embodiment of the invention.

In accordance with another embodiment of the invention, the base further includes a channel extending from the at least one socket receiving aperture. The channel is narrower than the mounting screw head diameter. To illustrate, a base 700 similar to bases 400 and 600 is shown in FIG. 7. Like or corresponding parts similarly bear like or corresponding reference numerals. Base 700 includes a base mounting aperture 750 with retaining device 760 as described above, e.g., as shown in FIG. 5. Base 700 further includes a channel 790 that extends from socket receiving aperture 710 along longitudinal axis L and toward the top of base 700, i.e., the end to which to hinges 706 are attached. Channel 790 is narrower than mounting screw head diameter 124. Channel 790 is positioned so that it extends over mounting screw aperture 112 when base 700 is attached to electrical outlet 100. Channel 790 has sufficient width so that mounting screw 118 can slidably fit within it, but so that it will not pass mounting screw head 122. Channel 790 has a length along longitudinal axis L sufficiently so that, when mounting screw 118 is partially tightened into mounting screw aperture 112, and when base 700 is placed over electrical outlets so that mounting screw 118 is fitted within channel 790, base 700 may be moved along longitudinal axis L to a point at which mounting screw 120, partially engaged in mounting screw aperture 114, is aligned with base mounting aperture 750.

In accordance with still another aspect of the invention, a method is provided for mounting a base to an electrical outlet. The electrical outlet includes a mounting screw aperture disposed along a longitudinal axis for receiving a mounting screw having a mounting screw head to mount the electrical outlet to a box. The mounting screw head has a mounting screw head diameter. The electrical outlet also has at least one socket face for receiving an electrical plug.

In accordance with a related aspect of the invention, a method is provided for mounting a base to an electrical outlet, as described above, but wherein the electrical outlet includes first and second mounting screw apertures disposed along a longitudinal axis for receiving respective first and second mounting screws, each having a mounting screw head to mount the electrical outlet to a box. Both mounting screw heads have a mounting screw head diameter.

To provide an illustrative example, the method according to these aspects of the invention will be described with reference to electrical outlet 100 of FIG. 1, and bases 200, 300 and 400 according to the previously described preferred embodiments of the invention. It should be noted, however, that this is merely for illustrative purposes and not necessarily by way of limitation. The method may be implemented using bases other than the specific ones shown and described herein.

The method according to these aspects of the invention comprises providing the base with a substantially planar backing member. The backing member includes at least one aperture for receiving the at least one socket face.

As implemented in the preferred methods, this step preferably comprises providing backing members 202, 302 and 402. Each of these backing members includes two socket face receiving apertures, i.e., apertures 210 and 212 for base 200, apertures 310 and 312 for base 300, and apertures 410 and 412 for base 400.

This step of the method also includes disposing a keyhole slot in the backing member and having first and second apertures. The first keyhole aperture is larger than the mounting screw diameter. The second aperture is smaller than the mounting screw aperture and is disposed in the backing member at a location on the longitudinal axis and corresponding to an aligned with the mounting screw aperture when the base is mounted to the electrical outlet using the mounting screw.

In accordance with the related method, the first step comprises providing a substantially planar backing member. The backing member includes at least one aperture for receiving the at least one socket face. It also includes first and second keyhole slots disposed in the backing member. Each of the first and second keyhole slots has first and second keyhole slot apertures. The first keyhole slot aperture is larger than the mounting screw head diameter. The second keyhole slot aperture is smaller than the mounting screw head aperture, and is disposed in the backing member at a location on the longitudinal axis. The second keyhole slot aperture of the first keyhole slot is aligned with the first mounting screw aperture, and the second keyhole slot aperture of the second keyhole slot is aligned with the second mounting screw aperture when the base is mounted to the electrical outlet using the first and second mounting screw.

As implemented in the preferred versions of the method, this first step includes, for base 200, providing keyhole slot apertures 220 and/or 222; for base 300, providing keyhole slot aperture 3s 320 and/or 322; and for base 400, providing keyhole slot 420. Optionally, the second keyhole aperture may include a bevel, in which instance the method includes tightening the mounting screw so that the mounting screw head resides in the bevel.

The first and second keyhole slot apertures of either or both keyhole slots may be disposed along a keyhole line substantially perpendicular to the longitudinal axis. In other versions of the method, the first and second keyhole apertures may be disposed along a keyhole lien substantially collinear with the longitudinal axis.

The method also includes a second step of partially inserting the mounting screw into the electrical outlet, positioning the base on the outlet so that the first aperture of the keyhole slot passes over the mounting screw head, moving the base so that the mounting screw passes through the second keyhole aperture, and tightening the mounting screw to secure the mounting screw head onto the base at the second keyhole aperture.

In the related version of this method, this second step includes partially inserting the first and second mounting screws into the respective first and second mounting screw apertures through the respective first and second keyhole apertures. It also includes a third step of testing the alignment of the base with the outlet so that the first keyhole slot apertures of the first and second keyhole slots are aligned with the respective first and second mounting screw apertures. It further includes a fourth step of tightening the first and second mounting screws to secure the mounting screws heads of the first and second mounting screws onto the base at the second keyhole slot apertures of the respective first and second keyhole slots.

As implemented in the preferred versions of the method, this second step includes inserting and partially tightening mounting screw 118 through first keyhole slot aperture 224 of keyhole slot 220 for base 200, through first keyhole slot aperture 324 of keyhole slot 320 for base 300, through first keyhole slot aperture 424 of keyhole slot 400, and in each instance, into mounting screw aperture 112. This second step also preferably includes inserting and partially tightening mounting screw 120 through first keyhole slot aperture 228 of keyhole slot 222 for base 200, through first keyhole slot aperture 328 of keyhole slot 322 for base 300, and in each instance, into mounting screw aperture 114. The bases then are aligned relative to the outlet, held in place, and the mounting screws fully tightened to secure each base to the outlet while maintaining the alignment.

In accordance with still another aspect of the invention, a method is provided for mounting a base to an electrical outlet. The electrical outlet includes a mounting screw aperture disposed along a longitudinal axis for receiving a mounting screw having a mounting screw head to mount the electrical outlet to a box. The mounting screw head has a mounting screw head diameter. The electrical outlet also has at least one socket face for receiving an electrical plug.

The method according to this aspect of the invention includes a first step of providing a substantially planar backing member. The backing member includes at least one aperture for receiving the at least one socket face. It also includes a base mounting aperture disposed in the backing member at a location aligned with the mounting screw aperture when the base is mounted to the electrical outlet using the mounting screw. The base mounting aperture is larger than the mounting screw head diameter. It should be noted that more than one such base aperture maybe provided.

To provide an illustrative example, the method according to these aspects of the invention will be described with reference to electrical outlet 100 of FIG. 1 and bases 400, 600 and 700 according to the previously described preferred embodiments of the invention. It should be noted, however, that this is merely for illustrative purposes and not necessarily by way of limitation. The method may be implemented using bases other than the specific ones shown and described herein.

As implemented in the presently preferred versions of this method, this first step includes providing a base mounting aperture 450 in base 400, base mounting apertures 650 and/or 670 in base 600, and base mounting aperture 750 in base 700, as described above.

The method also includes a second step of partially inserting the mounting screw into the electrical outlet and a third step of using a detachable retaining device on the base mounting aperture wherein the retaining device has a diameter smaller than the mounting screw head diameter, and tightening the mounting screw to secure the mounting screw head onto the retaining device.

As implemented in the preferred methods, this second step comprises inserting and partially tightening a mounting screw, such as mounting screws 118 and 120, through the respective base mounting apertures and into the corresponding mounting screw apertures. The third step preferably includes using a retaining device such as retaining device 460, 660 and 760 (e.g., FIG. 5), on the respective base mounting apertures. As noted above, the retaining device has a diameter smaller than the mounting screw head diameter.

The third step also preferably includes tightening the mounting screw or screws to secure the mounting screw head onto the retaining device or devices, after or in conjunction with appropriately aligning the base with respect to the outlet.

Optionally, the third step may include providing a beveled surface on the retaining device, and tightening the mounting screw so that the mounting screw head seats in the bevel. Also as an option, the first step may include providing the base mounting aperture with a beveled surface and providing the retaining device with a beveled surface for mating with the base mounting aperture beveled surface, and the third step may include tightening the mounting screw so that the retaining device bevel mates with the base mounting aperture bevel. An illustrative example would involve the use of beveled surfaces 452 and 462, as illustrated in FIG. 5.

Additional advantages and modifications will readily occur to those skilled in the art. For example, the longitudinal axis considered with respect to the positioning of the various apertures need not necessarily lie at the center of the outlet and base, nor necessarily need it be perpendicular to the top and bottom edges of the box. Therefore, the invention in its broader aspects is not limited to the specific details, representative devices and methods, and illustrative examples shown and described. Accordingly, departures may be made from such details without departing from the spirit or scope of the general inventive concept as defined by the appended claims and their equivalents.

What is claimed is:

1. A base for an electrical outlet having at least one opening for a socket face, the base comprising:
   a front surface and a back surface opposing the front surface;
   at least one opening extending through the base from the front surface to the back surface, the at least one opening having a size large enough to receive at least one socket face;
   at least one mounting screw aperture opening extending through the base, the mounting screw aperture having a first portion sized large enough to receive a head of a mounting screw, and at least a second portion extending into the first portion and through the base, the second portion sized large enough to allow a shaft of the mounting screw to extend through the base but small enough to disallow the head of the mounting screw from passing through the base; and
   a first peripheral side of the base comprising at least one hinge member thereon;
   wherein the base is a single molded piece; and
   wherein the base is configured with the second portion of the mounting screw aperture accessible after the base is installed on the electrical outlet for selective tightening, loosening, and adjustment of the base.

2. The base of claim 1, wherein the second portion of the mounting screw aperture includes a bevel.

3. The base of claim 1, the first peripheral side of the base having at least a pair of hinge members.

4. The base of claim 1, wherein two adjacent peripheral sides of the base each comprise at least one hinge member.

5. A one piece base for an electrical outlet cover having at least one socket face and at least one mounting screw aperture, the base comprising:
   a front surface and a back surface opposing the front surface, the front and back surfaces having a first edge having a first hinge member thereon;
   at least one socket face aperture extending through the front and back surfaces of the one piece base; and at least one mounting screw aperture opening extending through the base, the mounting screw aperture having a first portion sized large enough to receive a head of a mounting screw, and at least a second portion extending into the first portion and through the base, the second portion sized large enough to allow a shaft of the mounting screw to extend through the base but small enough to disallow the head of the mounting screw from passing through the base;

wherein the at least one socket face aperture is aligned with the at least one socket face and the second portion of the mounting screw aperture is aligned with the at least one mounting screw aperture of the electrical outlet when the base is mounted to the electrical outlet using a mounting screw;

wherein the one piece base is a single molded piece; and wherein the mounting screw aperture is accessible for selective tightening, loosening, and adjustment of the base after the base is mounted on the electrical outlet.

6. The base of claim 5, wherein the second portion of the mounting screw aperture includes a bevel.

7. The base of claim 5, the first side of the base having at least a pair of hinge members.

8. The base of claim 5, wherein two adjacent edges of the base each comprise at least one hinge member.

9. A method of mounting a one piece base to an electrical outlet, the method comprising:

partially inserting a mounting screw through a mounting screw aperture of the electrical outlet;

providing the base as one molded piece having at least a first edge with a respective hinge member thereon;

positioning the one piece base in relation to the electrical outlet so that at least one mounting screw aperture opening extending through the base is aligned with a head of the mounting screw, the at least one mounting screw aperture having a first portion sized large enough to receive the head of the mounting screw and at least a second portion extending into the first portion and through the base, the second portion sized large enough to allow a shaft of the mounting screw to extend through the base but small enough to disallow the head of the mounting screw from passing through the base;

passing the mounting screw head into the first portion of the mounting screw aperture;

aligning the one piece base with the electrical outlet so that a socket face of the electrical outlet aligns with a socket face aperture in the base and so that a shaft of the mounting screw extends through a second portion of the mounting screw aperture;

tightening the mounting screw to secure the mounting screw head onto the one piece base; and leaving the keyhole slot aperture and the mounting screw head accessible for selective tightening, loosening, and adjustment of the one piece base.

10. The method of claim 9, wherein tightening the mounting screw further comprises tightening the mounting screw head into a bevel associated with the second portion of the mounting screw aperture.

11. A one piece base for an electrical outlet having at least one socket face and at least one mounting screw aperture, the one piece base comprising:

a front surface and a back surface opposing the front surface, the front and back surfaces having a first edge with a first hinge member thereon;

at least one socket face aperture through the front and back surfaces;

at least one mounting screw aperture opening extending through the base, the mounting screw aperture having a first portion sized large enough to receive a head of a mounting screw, and at least a second portion extending into the first portion and through the base, the second portion sized large enough to allow a shaft of the mounting screw to extend through the base but small enough to disallow the head of the mounting screw from passing through the base;

wherein the one piece base is configured such that when the one piece base is installed on the electrical outlet, the at least one socket face aperture surrounds the at least one socket face, the second portion of the at least one mounting screw aperture is aligned with the mounting screw head, and the at least one mounting screw aperture is positioned to allow for adjustment of the mounting screw after installation of the one piece base on the electrical outlet.

12. The one piece base of claim 11, wherein the second portion of the mounting screw aperture includes a bevel.

13. The base of claim 11, the first edge of the base having at least a pair of hinge members.

14. The base of claim 11, wherein two adjacent edges of the base each comprise at least one hinge member.

15. The base of claim 14, the at least two adjacent edges each having at least a pair of hinge members.

* * * * *